United States Patent [19]
Gass, Jr. et al.

[11] Patent Number: 5,822,503
[45] Date of Patent: Oct. 13, 1998

[54] METHOD OF MANIPULATING COLOR EPS FILES

[75] Inventors: Al C. Gass, Jr., Lynnwood; Jack M. Kirstein, Bainbridge Island; John W. Fearnside; Thomas A. Donovan, both of Seattle; Chiiwen Kevin Hu, Bellevue, all of Wash.

[73] Assignee: Adobe Systems Incorporated, San Jose, Calif.

[21] Appl. No.: 879,476

[22] Filed: Jun. 20, 1997

Related U.S. Application Data

[63] Continuation of Ser. No. 78,079, Jun. 15, 1993, abandoned.

[51] Int. Cl.$^6$ ........................................ G06F 15/00
[52] U.S. Cl. ............................. 395/109; 707/523
[58] Field of Search ..................... 395/101, 109, 395/941, 943, 946, 935; 707/522, 523, 528, 908; 345/427, 428, 431, 475; 358/500, 501, 512, 515, 518, 532, 537, 445; 382/162, 163, 167, 276; 399/39, 54, 112

[56] References Cited

U.S. PATENT DOCUMENTS

| | | | |
|---|---|---|---|
| 5,029,115 | 7/1991 | Geraci ........................................ | 364/523 |
| 5,202,935 | 4/1993 | Kanamori et al. ......................... | 382/54 |
| 5,254,978 | 10/1993 | Beretta ...................................... | 345/150 |
| 5,317,678 | 5/1994 | Okawara et al. .......................... | 395/126 |
| 5,384,901 | 1/1995 | Glassner et al. .......................... | 395/131 |
| 5,416,890 | 5/1995 | Beretta ...................................... | 395/131 |

OTHER PUBLICATIONS

Aldus Freehand, Version 3.0, distributed by Aldus Corporation, 411 First Avenue South, Seattle, WA 98104.

ColorManager, Version 3.1, distributed by CompuSense Ltd., Avondale House, The Square, Ballingcollig, Cork, Republic of Ireland. The ColorManager program is an interface (Quark Xtension) for use with Quark Xpress, a desktop publishing program distributed by Quark, 1800 Grant Street, Denver, CO 80203.

Extrasensory Conceptions Upgraded, Computer Select Jan. 1993 Article.

Eight Presentation Software Evaluations in 'Presentations with Style, Substanc, and Splash.' Nov. 10, 1992 Clavis Corp.

QuarkXpress, Reference Manual (1986–1991 by Quark Inc) E27–E33 F7–F10 App E5 420.

QuarkXpress, Using QuarkXpress (1986–1991 by Quark Inc) 2.51,5.3,5.7, 5.11,–5.17 7.13–7.21.

Aldus PageManager, User Manual (1987 by Aldus Corporation) X, 2–66, 4–4 to 4–32.

Aldus PageManager, Reference Manual (1987 by Aldus Corporation) 1–46 to 1–49, 1–58 2–9, 4–13, 4–22, 2–12, to 2–15.

Microsoft Windows, User's Guide (1990 by Microsoft) 147–153, 263–271.

Creating Graphics Import Filter Libraries for Windows Applications Welch, Kevin P. Jan.–Feb. 1992 Article.

*Primary Examiner*—David K. Moore
*Assistant Examiner*—Gabriel I. Garcia
*Attorney, Agent, or Firm*—Fish & Richardson P.C.

[57] ABSTRACT

Disclosed is a method of modifying one or more colors contained in an Encapsulated PostScript (EPS) file in a computer program such as a desktop publishing program (50). After an EPS file has been imported into a publication, all identifiable colors in the EPS file, i.e., spot colors and, in some instances, process colors, are displayed to a color palette (84). The color palette allows a user to see those colors (or inks) that are needed to print the publication, and subsequently modify the colors without having to return to the originating program that exported the EPS file. The method includes creating a publication color list that contains those colors that have been modified, generating a PostScript (PS) color table from the publication color list after the modifications are complete, and changing the attributes of those colors in the PS table while printing the publication to a file or to a printer.

3 Claims, 16 Drawing Sheets

PROLOG·ALPS1

PS COLOR TABLE: blue=ijkl prevcontext=ALPS1

SCRIPT x=findcmykcustomcolor
findcmykcustomcolor=DPPdef

PROLOG·ALPS2   prevcontext=ALPS1

PS COLOR TABLE: blue=efgh x=findcmykcustomcolor
findcmykcustomcolor=DPPdef abcd (blue)
findcmykcustomcolor

274 — DPP DOCUMENT
272 — DPP EPS
270 — OTHER EPS

*Fig. 13*

METHOD OF MANIPULATING COLOR EPS FILES

This application is a continuation application of copending application Ser. No. 08/078,079, filed on Jun. 15, 1993.

FIELD OF THE INVENTION

The invention generally relates to desktop publishing programs and, more particularly, to a method of manipulating color Encapsulated PostScript (EPS) files within such programs.

BACKGROUND OF THE INVENTION

Color printing has traditionally required the integration of many unique and varied talents to see a project through from conception to a printed page. Prior to "desktop publishing," ideas or concepts were typically first drawn by hand and photographed, any text or illustrations added, and the aggregate of pictures and text used to produce a printed page. The traditional process generally required, in addition to design personnel, a paste-up person, typesetting bureau and a lithography department that would produce separations from the photographs.

Desktop publishing has relieved some of the burden of publishers by allowing color production, i.e., drawing and layout, to be integrated electronically using personal computers. Color documents can now be designed, enhanced, color-corrected, and separated on a computer "desktop". The success of desktop publishing is, in large part, the result of standards-based computer programs such as the page description language (PDL) PostScript from Adobe Systems Incorporated of Mountain View, Calif. PostScript has become the industry standard that serves as an intermediary between applications packages, e.g., desktop publishing programs, and PDL-compatible composite reproduction equipment, such as a desktop printer. The applications packages translate information for a page into PDL for transmission to the PDL-compatible desktop printer. The PDL-compatible printer includes an interpreter that converts the PDL code to low-level instructions that indicate to the printer how to render the text and graphics. Alternatively, the information can be transferred to a file for importation by another applications program or for use by a service bureau. For further information on the PostScript programming language, please see *PostScript Language Reference Manual*, 2nd Ed., by Adobe Systems, Inc., published by Addison Wesley, which is hereby incorporated by reference.

A desktop printer uses toner to produce the colors comprising a color publication. Because composite printing is generally efficient only for small quantity jobs, larger quantities of the same publication are generally reproduced on a commercial printing press using ink. Methods of printing color publications using a commercial printer press include process-color printing, spot-color printing, or a combination of the two. Process-color printing separates the original image into its cyan (C), magenta (M), yellow (Y), and black (K) components to recreate the original shadings of color in the publication. This is accomplished by printing dots of the process-color inks in different combinations in close proximity to simulate a variety of colors on a printed page. Spot-color printing involves printing one or more specific colors (or inks) that have been specified according to a color matching system. One popular color matching system is the PANTONE™ MATCHING SYSTEM by Pantone, Inc. Spot-color printing is often used to produce colors that are not easily produced using CMYK inks, such as silver, gold, and fluorescent colors. Spot-color printing is also used in lieu of printing the four process colors, such as when only a couple of inks are required for a particular publication.

Before a color publication can be reproduced on a commercial printing press, each page containing composite art must be separated into its component colors by printing a film separation for each ink (cyan, magenta, yellow, black if process colors are to printed) and any spot colors. Thus, process-color printing always requires four film separations. Spot-color printing requires a separation for each color being printed. A commercial printer uses these film separations to create the printing plates used on the press. For instance, if one specifies the four process colors and a single spot color in a publication, there will be five separations, and hence printing plates, for each page. A separate component ink is added by each plate as the pages in the publication pass through the press. For a more detailed explanation of the commercial printing process, please see the *Commercial Printing Guide* from PageMaker®, Version 5.0. PageMaker® is desktop publishing program produced by Aldus Corporation, the assignee of the present application. The PageMaker 5.0 *User Manual and Commercial Printing Guide* are hereby incorporated by reference. For additional information on desktop publishing generally, see *Desktop Publishing in Color* by Michael Kieran, published by Bantam Books (1991), which is also incorporated by reference.

Computer programs that have drawing capabilities generally work with three types of data: (1) text, (2) raster graphics, and (3) vector graphics. Some popular textual formats include: ASCII (.TXT), WordPerfect (.WP), Microsoft Word (.DOC), and Document Content Architecture (.DCA). Vector graphics are created using a PDL format, which employs English commands to specify vectors comprising each image. Raster graphics are created using bitmaps. Popular graphic formats include: Tag Image File Format (.TIFF); Windows Bitmap (.BMP); PostScript (.PS); Encapsulated PostScript (.EPS); Macintosh Picture (.PICT) and Color Picture (.PICT2); Computer Graphics Metafile (.CGM); Windows Metafile (.WMF); and Targa (.TGA). Vector graphic files are, upon creation, typically first stored in the native file format of the originating program, and then converted to a standard PDL format such as PostScript when the graphics are sent to a printer or to a file for importation by another computer program. The Encapsulated PostScript (EPS) format is used primarily to transfer vector graphics between different software programs.

An EPS file contains a set of PostScript commands that are grouped together, with the set being treated as an independent entity by the importing application program. Because of its encapsulated nature, individual items within the file may not be "degrouped." As a consequence, the graphics within the file may not be edited on a graphic-by-graphic basis without altering the original EPS file. However, the size and placement of the entire file may be manipulated. Higher quality clip-art image are typically EPS images.

FIG. 1 illustrates a typical chain of events that occurs when graphics within a publication are produced utilizing desktop publishing. At block 30, instructions concerning the drawings to be produced are communicated to an artist or graphics designer. The drawings are then created by the artist/graphic designer at block 32 using a preferred drawing program or other computer program having drawing capabilities, referred to as the "originating program." It is noted that for lengthy publications there may be a relatively large number of different artists/graphic designers commissioned. This will likely result in the creation of drawings from various originating programs. The drawings are stored as a color EPS file for exportation, and subsequently submitted to a layout person in a graphics department, shown at block 34.

At block 36, the layout person uses a page layout/desktop publishing program such as Aldus PageMaker® to import the EPS files and combine the files with any text and raster (bitmapped) graphic files as part of the publication. The newly created draft of the publication is then sent to a composite printer, shown at block 38. The resulting composite print is proofed and editing changes are made. Upon finalization of the publication, prints can either be made by the composite printer or the publication may be sent to a service provider, i.e., a service bureau, separation facility, or commercial printer, for printing, shown at block 40. The service provider will often suggest color changes that, for example, will make the publication less expensive to print. These changes are submitted to the layout person which, upon approval, are submitted to the artist/graphic designer, who incorporates the changes.

A limitation of the above-described process is that all but very minor changes to the graphics contained in an imported color EPS file created by the artist/graphic designer must be made by the originating program. The originating program accomplishes drawing changes by converting the EPS file back into the program's native file format, implementing the changes, and generating another EPS file. As will be appreciated from FIG. 1, changes to graphics in the publication will often entail sending EPS files back and forth between the artist 1 graphic designer, layout person and, sometimes, the service provider.

As an illustration of the above, assume a color EPS file contains a circle and a square in some fixed relationship, and that the desktop publishing program is not the originating program. While the desktop publishing program will likely allow the placement and size of the entire EPS file to be altered, these programs typically have not had the capability to allow manipulation of any graphic independent of the others. Thus, what might be considered to be relatively minor changes, such as changing the color of the circle or moving the circle away from the square, require access to the originating program. The invention alleviates at least some of the above-described problems associated with importation of EPS files by allowing modifications of colors in EPS files to be carried out using the desktop publishing program, rather than having to export each file back to its creator.

SUMMARY OF THE INVENTION

The invention is a method of modifying one or more colors contained in an EPS file using a computer program, such as desktop publishing program. Each color in the EPS file has color attributes that define the color. The method includes the steps of (a) importing the EPS file into the desktop publishing program; (b) identifying colors in the EPS file and creating a color list containing each identified color; (c) displaying the color list; and (d) changing, in response to user input, the color attributes of one or more colors in the list.

In accordance with further aspects of the invention, a method of modifying color graphics stored in a color EPS file while generating PostScript to be sent to a file or printer is disclosed. The EPS file includes PostScript color separation operators (CSOs) that bring up EPS color definitions specifying the colors comprising the color graphics. The method comprises the steps of: (a) accepting color modifications for one or more graphics in the EPS file; (b) creating a PostScript table correlating the color modifications to the graphic(s) affected by those modifications; (c) storing (modifier) current color separation operators in the EPS file; (d) redefining the color separation operators to catch colors as they are being sent to a file or printer; (e) changing the color definition of each color in the color table from the EPS color definitions to those values stored in the color table; (f) restoring the color separation operators to their original definitions; and (g) calling the color separation operator to continue the generation of PostScript.

In accordance with still further aspects of the invention, a method of displaying color names in a color file that has been imported into a desktop publishing program includes the steps of: (a) identifying a color in the color file; (b) comparing the name of the identified color to a color list and adding the identified color to the list if it is not already present; (c) repeating steps (a)–(b) until each identifiable color in the color file has been added to the color list; (d) determining whether the color file is an Encapsulated PostScript (EPS) file; and (e) displaying the names in the color list with designations indicating whether each color in the color list is contained in an EPS file, a tint, or both.

BRIEF DESCRIPTION OF THE DRAWINGS

The foregoing aspects and many of the attendant advantages of the invention will become more readily appreciated through the following drawings, referred to throughout the Detailed Description, wherein:

FIG. 13 is a pictorial representation of nesting that occurs when an EPS file is modified using the desktop publishing program, exported as an EPS file, with the exported EPS file being again imported into the desktop publishing program;

DETAILED DESCRIPTION OF THE PREFERRED EMBODIMENT

Figure 1:
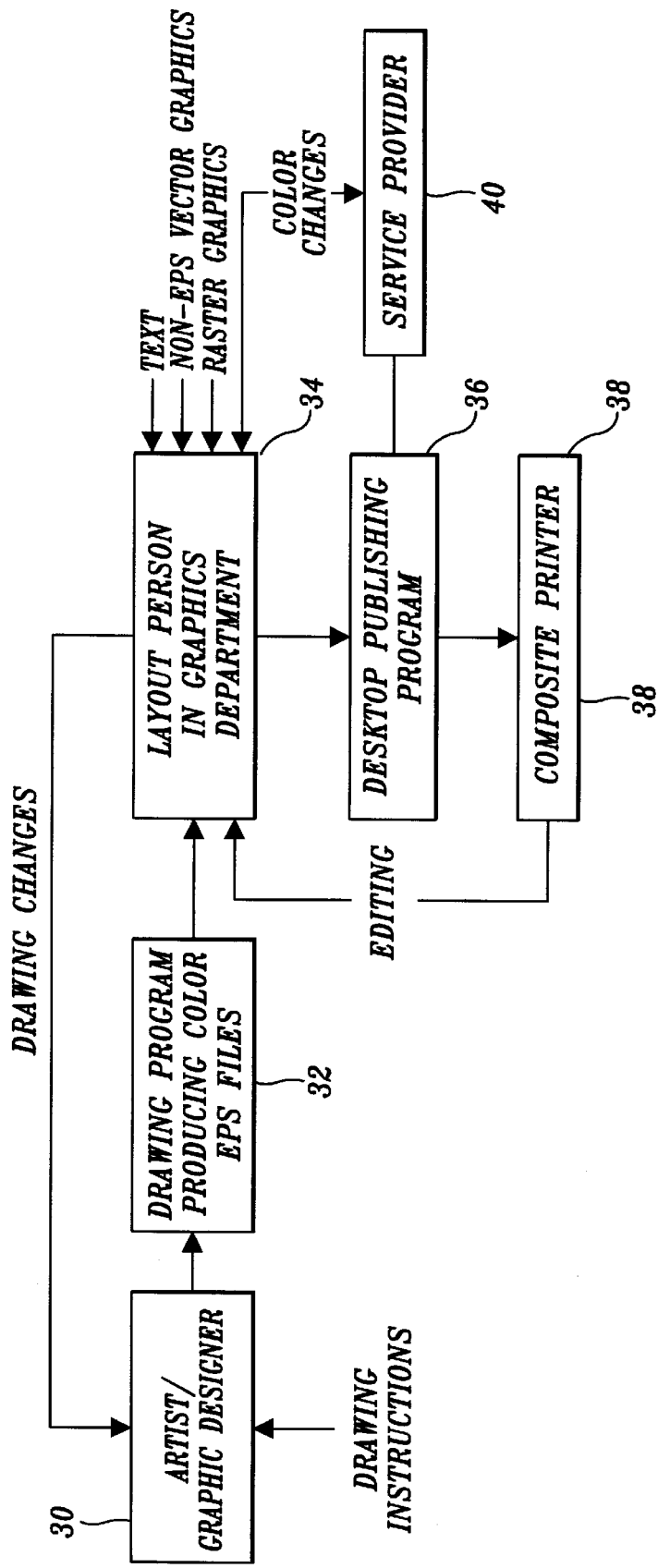
FIG. 1 is a block diagram depicting a typical interaction between the conception, illustration, layout and printing of graphics utilizing desktop publishing.
Figure 2:
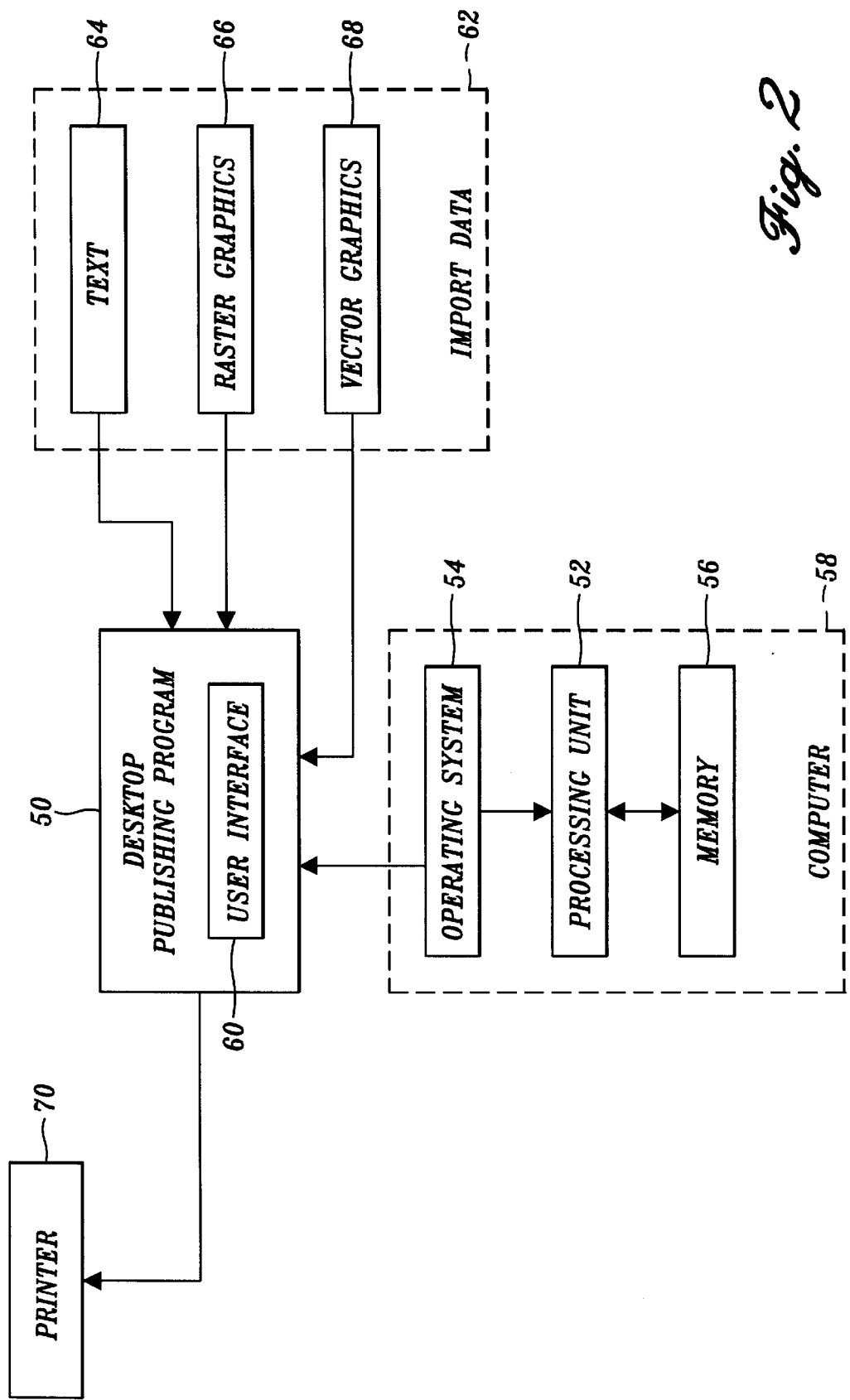
FIG. 2 is a block diagram of a desktop publishing program suitable for incorporating the present invention.

A computer program such as a desktop publishing program 50 suitable for manipulating colors contained in a color EPS file, as well as incorporating text and other aspects of documents to be published, is shown generally in FIG. 2. Throughout the specification and claims, the term "desktop publishing program" is hereby defined as any computer program that has the ability to import EPS files, as the benefits of the invention are not limited to an application whose primary purpose is to combine text and graphics. Thus, although the specification makes reference to a desktop publishing program that has the ability to combine text and graphics, the technology disclosed herein may advantageously be incorporated in programs such as presentation, art and drawing programs.

The desktop publishing program 50 runs on a processing unit 52 controlled by an operating system 54. Memory 56 is connected to the processing unit and generally comprises, for example, random access memory (RAM), read only memory (ROM), and magnetic storage media such as a hard drive, floppy disk, or magnetic tape. The processing unit and memory are typically housed within a personal computer 58, including Macintosh™, International Business Machines (IBM)™, and IBM-compatible personal computers. When used with IBM and IBM-compatible personal computers, the operating system 54 may incorporate a windowing environment such as Microsoft Windows™.

The desktop publishing program 50 includes a user interface (UI) 60 that interacts between the operating system 54 and the internal process application of the desktop publishing program 50. The desktop publishing program 50 is able to import and export text, images, and graphics from many different sources, i.e., originating programs. Originating programs may include, for example, illustration, image enhancement, word processing, and desktop publishing programs. At block 62, import data from one or more originating programs are shown exported to the desktop publishing program 50. The import data 62 may include text 64, raster (bitmap) graphics 66, and vector graphics 68. The importation of text, graphics, and images is achieved through the ability of the desktop publishing program 50 to recognize various file formats, including EPS files. After the text, raster graphic, and vector graphic files comprising the publication have been incorporated, the publication is sent to a composite printer or service provider for reproduction, shown at block 70.

Figure 3:
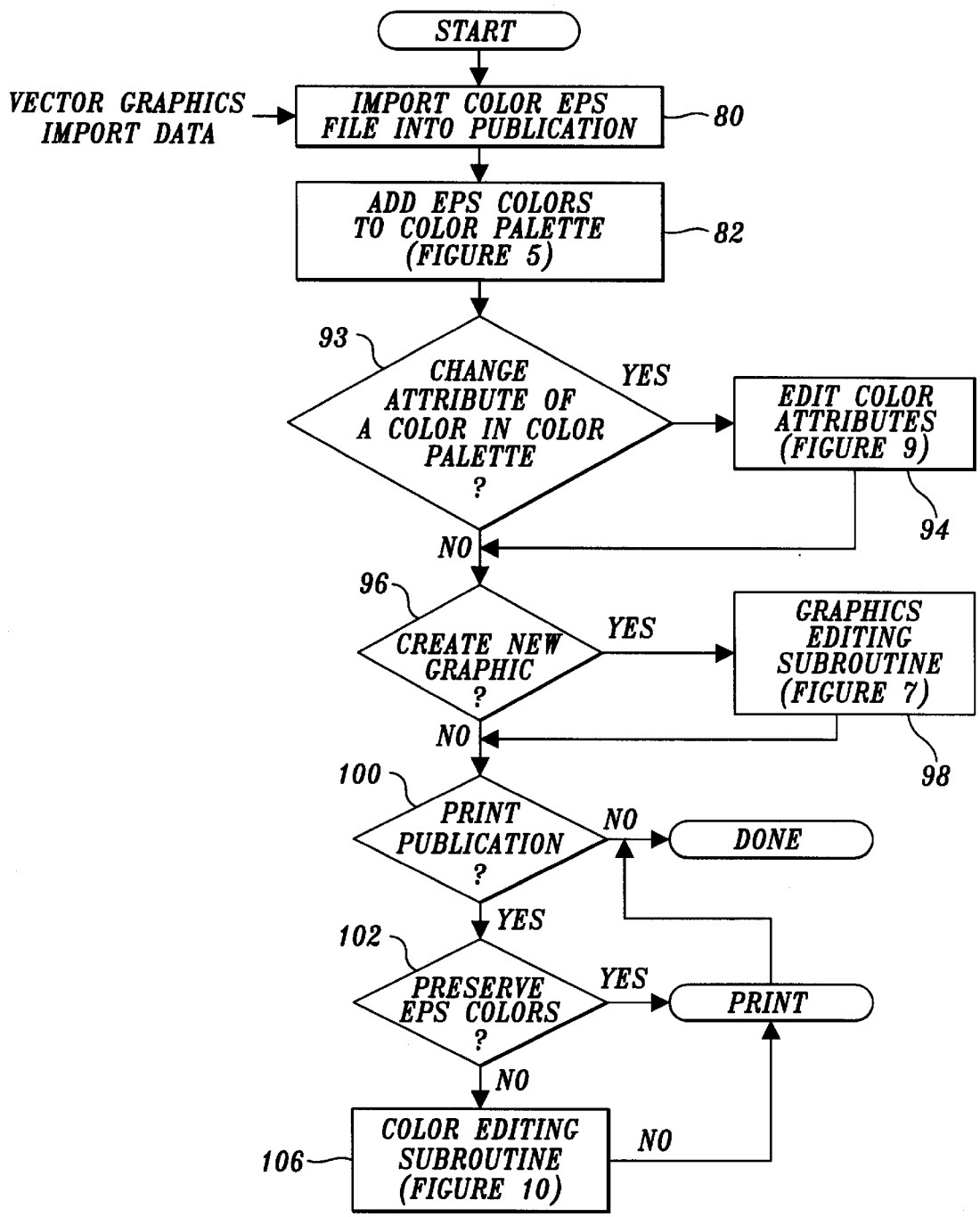
FIG. 3 is a flow chart illustrating how color graphics in an EPS file are modified by the present invention.
Figure 4:
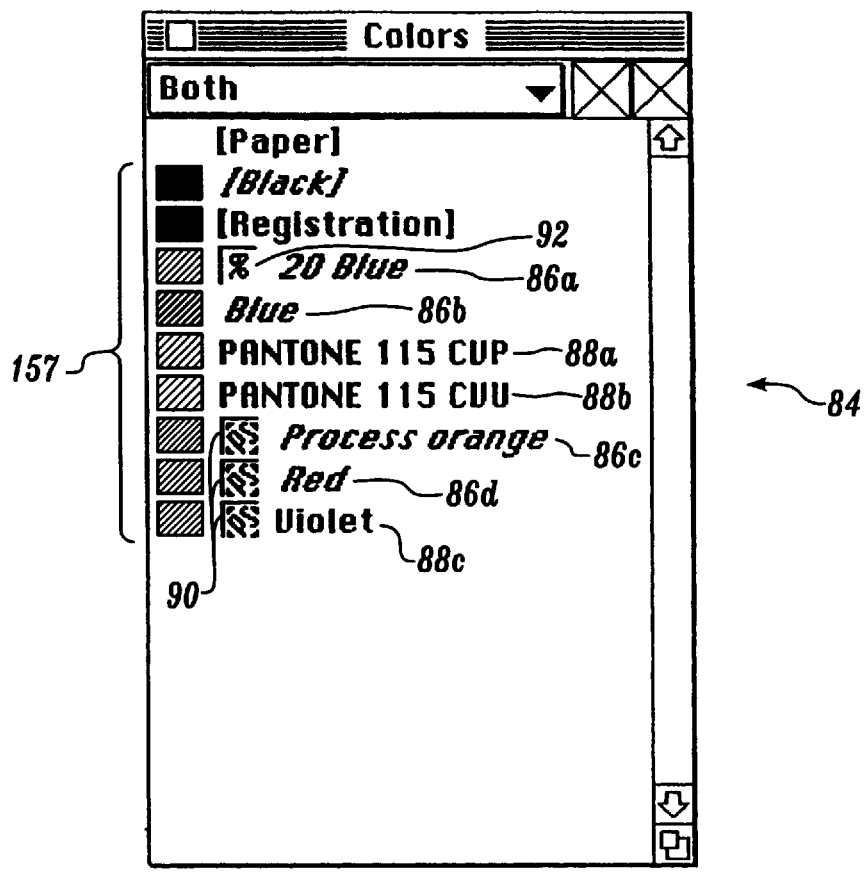
FIG. 4 is a pictorial representation of a color palette illustrating the colors contained in a publication and their attributes.
Figure 5:
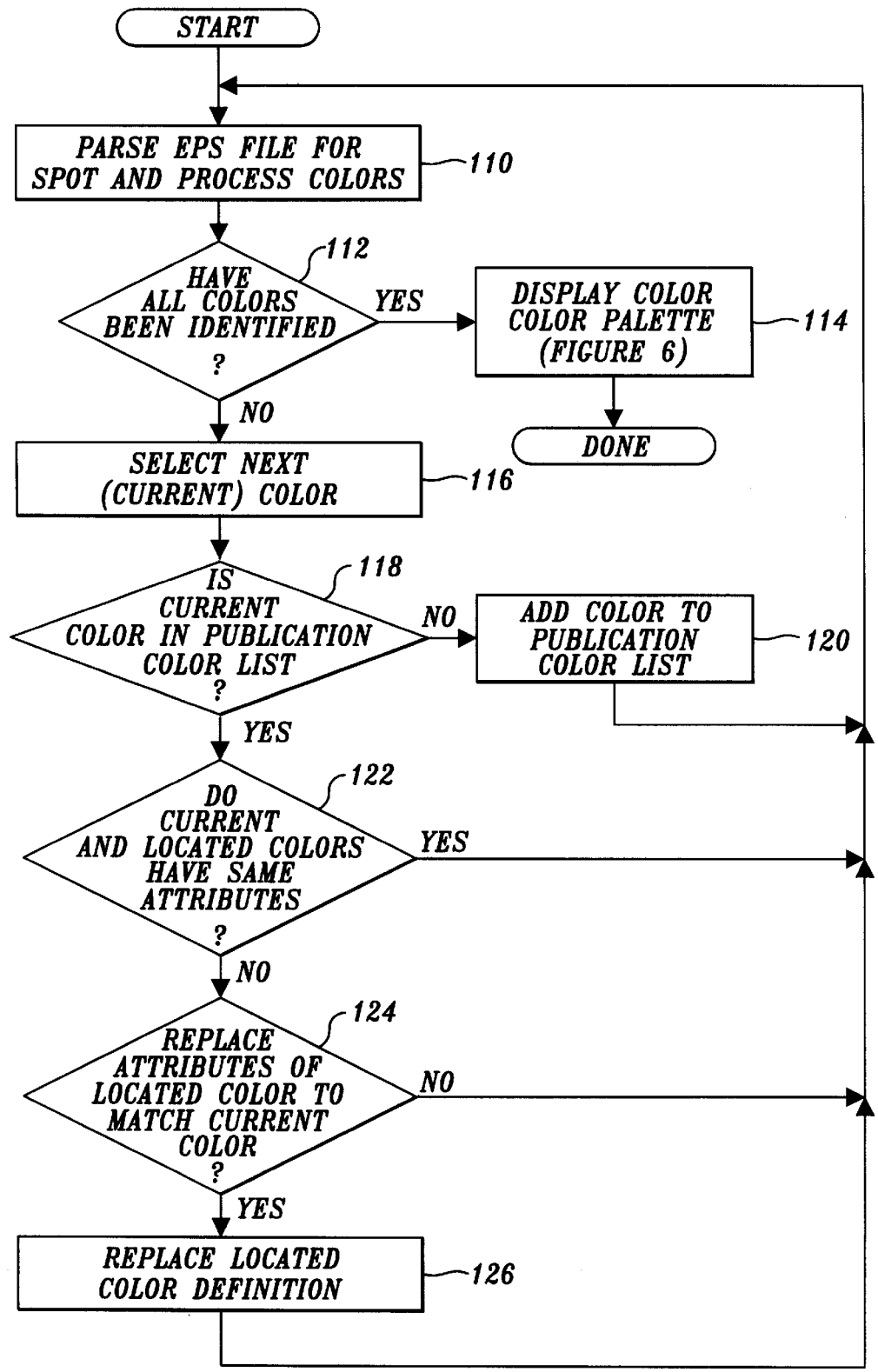
FIG. 5 is a flow chart illustrating how colors contained in an EPS file are added to a color palette.

FIG. 3 illustrates an exemplary routine for modifying the color of the graphics of color EPS files in accordance with the invention. At block 80, vector graphics import data contained in a color EPS file are brought into the publication using the desktop publishing program 50. At block 82, identifiable colors in the color EPS file are added to a color palette within the desktop publishing program. FIG. 4 illustrates a color palette 84 in accordance with the invention that contains a listing of those colors in the current publication that were either created using the desktop publishing program or imported from an EPS file. FIG. 5, discussed below, is a flow chart that shows how EPS colors are added to a color palette of the type shown in FIG. 4.

As shown in FIG. 4, the color palette differentiates between process and spot colors by denoting process colors in italics. The illustrative process colors include: 20 Blue 86a, Blue 86b, Process Orange 86c and Red 86d. Illustrative spot colors include: PANTONE 115 CVP (ProSim) 88a, PANTONE 115 CVU (Uncoated) 88b, and Violet 88c. Further, the color palette includes: a PostScript (PS) icon 90 which designates those colors that are contained in an imported EPS file, namely, Process Orange 86c, Red 86d and Violet 88c, and a tint (%) icon 92 that indicates those colors in the current publication that are a tint of another color, namely, 20 Blue 86a. A tint is a percentage of the ink of one color used to create another color. Information regarding tints is important to a commercial printer because tint information indicates that a listed spot color, although having a different name, does not require an additional separation to print. The 20 Blue designation is an indication that this color is a 20% tint of the process color named Blue.

Users of a desktop publishing program incorporating a color palette of the type shown in FIG. 4 can instantly see how many inks, and thus separations, will be required to print a publication. In response to this knowledge, the user may modify colors according to the invention to reduce the required number of separations, and hence the costs associated with printing. As an example, the ProSim and Uncoated versions of PANTONE 115 in FIG. 4 are separate inks. However, using a cost-benefit analysis, it may be desirable to make one of the PANTONE 115 spot colors a tint of the other, thus reducing the total number of separations by one. Another example of modifying colors to reduce cost is where the same ink is called two different names. This may occur when two different versions of a color matching system are used to create the imported EPS files. For instance, earlier versions of the Pantone color matching system used the designation PMS to indicate that a color was from the Pantone system. Current versions use the designation PANTONE. Thus, PMS 115 and PANTONE 115 may each be listed in the color palette, even though they are the same color. A user seeing both designations in the color palette and recognizing that they are the same color will change one designation so that they coincide. Without this intervention, the desktop publishing program would print two separations for the same ink merely because they have different names.

It should be noted that the color palette may contain more colors than those actually being used in a publication. This will occur when a user removes a color from all graphics having that color, but leaves the color in the color palette. It should also be noted that only those colors from the EPS file that are identifiable by the desktop publishing program will be listed in the color palette. The desktop publishing program 50 is able to identify or recognize only those colors in an EPS file that have a special tag and a color name associated with them. Thus, the ability to recognize colors will depend upon the file format of the originating program that created the EPS file. Typically, only spot colors will be identifiable because only these colors have a particular name associated with them. Spot colors are often identified and labeled using a color matching system. In contrast, although process colors may have names affiliated with them at the originating program level, the identifiers are lost when the colors are exported to an EPS file. Encapsulated PostScript convention is to combine the percentages of CMYK inks from all of the process color graphics into a single file upon exportation, providing to the importing program only the plate percentages of each component color. As a result of this convention, the process colors associated with a particular graphic are not identifiable. However, there are originating programs that do establish a name for process colors in an EPS file created by that program, an example of which is Aldus FreeHand. In such instances, the process colors that are imported from an EPS file will also be listed on the color palette. It is noted that process colors from all originating programs would be recognizable if they were saved as spot colors (using CMYK designations) in the originating program. However, these colors are no longer process colors upon their conversion.

With reference again to FIG. 3, after all of the identifiable EPS colors are added to the color palette, at block 93 a test is made to determine whether a user has modified a color contained in the color palette. Modifications that may be incorporated according to the invention include: (1) changing the color attributes of one or more spot colors in an EPS file; (2) changing the color values of the graphics in an entire file, for example, by making the gray scale values associated with the file a tint of a particular color; and (3) converting spot colors contained in an EPS file to process colors. In programs that associate process colors with a particular name, the identified process colors will also be included in the color palette. This allows a user to use these colors in modifications to existing graphics, or to define the colors of added graphics, with the assurance that the colors will match those previously created and exported to the EPS file.

Figure 7:
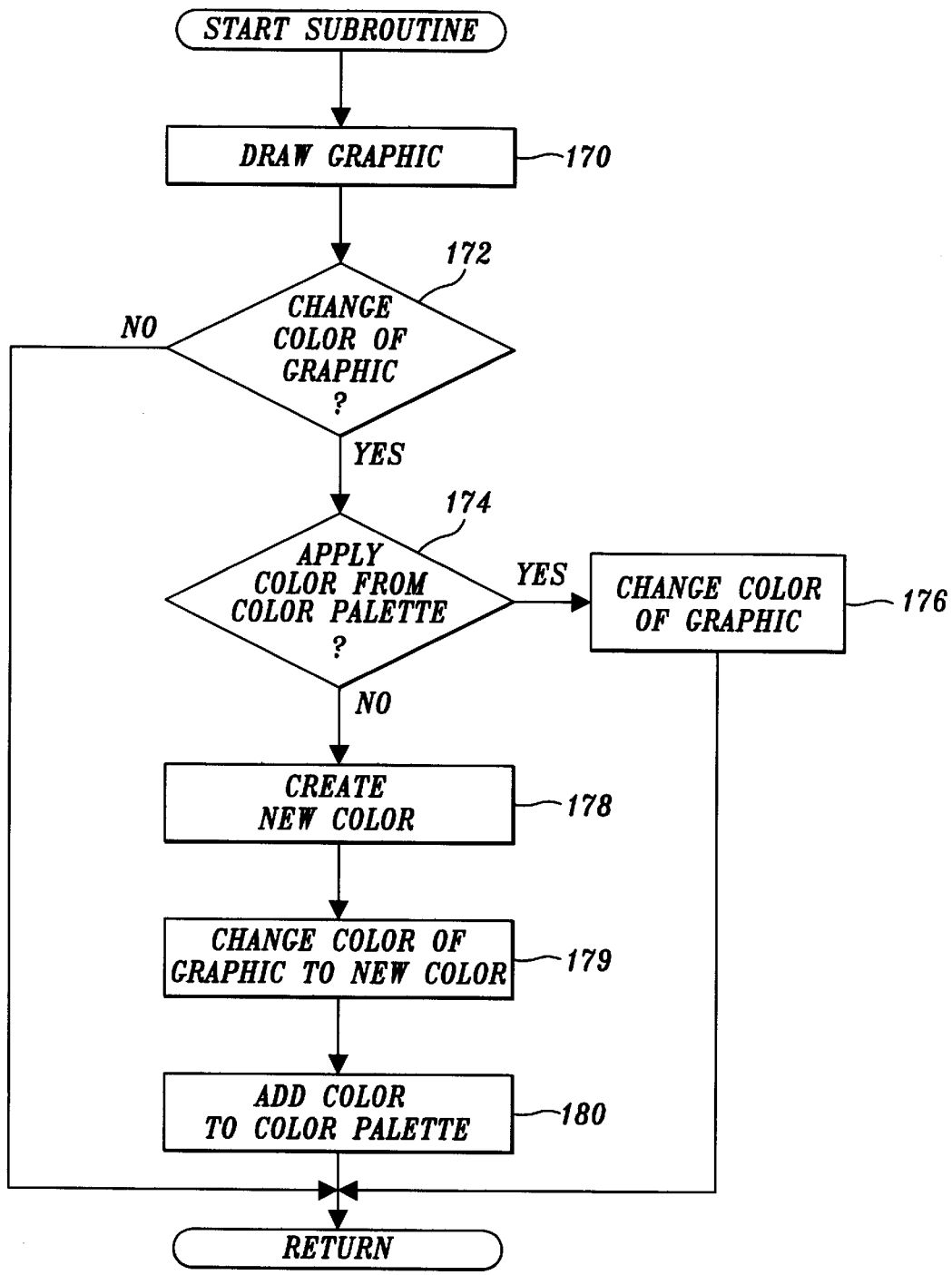
FIG. 7 is an exemplary routine illustrating how a graphic is added to a publication.
Figure 9:
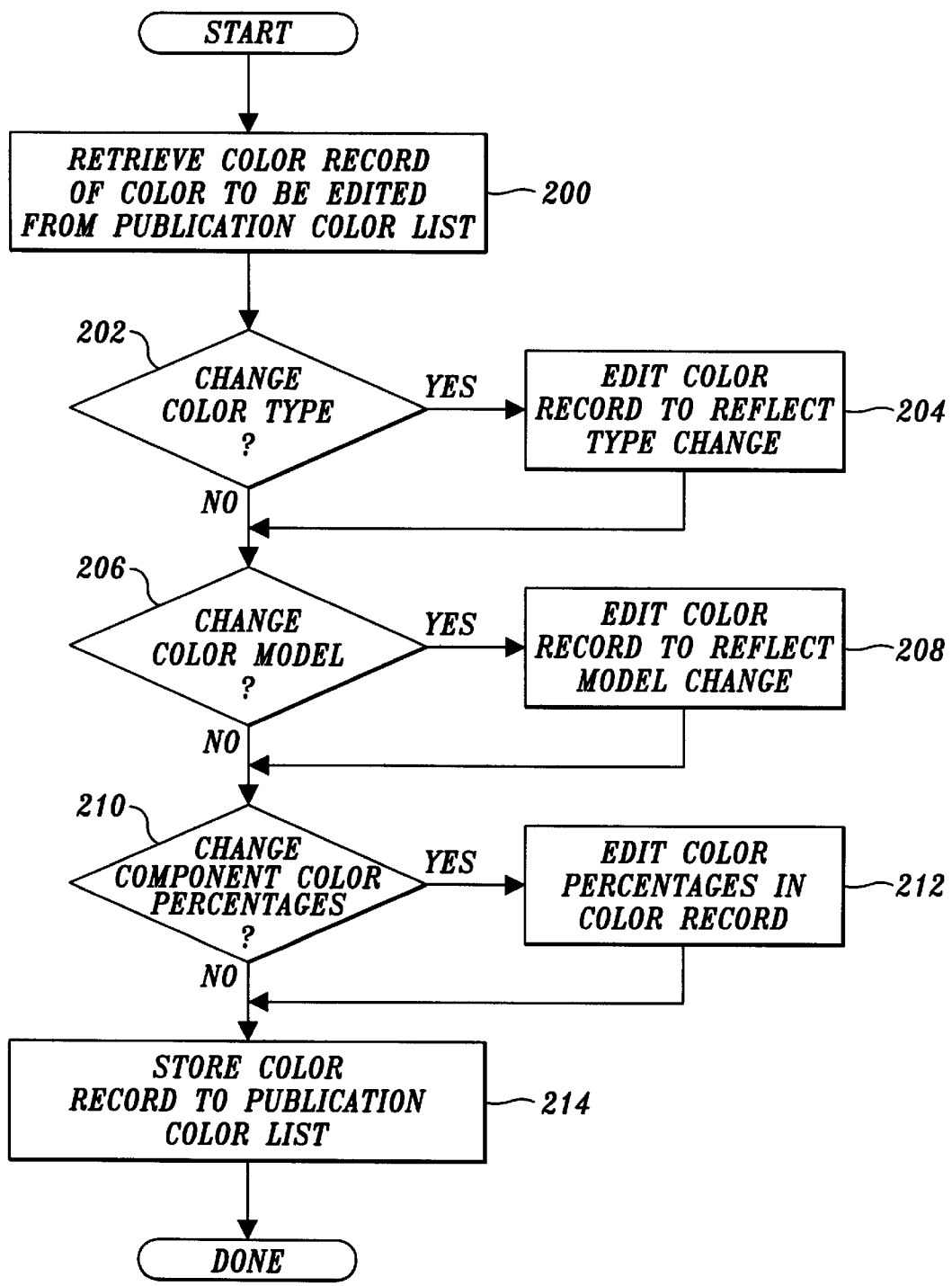
FIG. 9 is a flow chart illustrating how the attributes of a color are edited in response to user input.

If there is a user-defined change to any of the colors in the color palette, the attributes of that color are edited by the desktop publishing program at block 94. A suitable routine for editing the color attributes is illustrated in FIG. 9. The desktop publishing program does not change the EPS file itself, but instead creates lookup tables that modify the color upon printing the publication. The program then continues to block 96 where a test is made to determine whether the user wishes to create a new graphic. If a new graphic is to be created, the program branches to an editing subroutine that implements this effect, as shown at block 98. A suitable graphics editing subroutine is illustrated in FIG. 7 and described below. If no additional graphics are to be created, or after editing, the program continues to block 100 where a test is made to determine if the user wants to print the publication to a composite printer or a disk. Printing a file to disk entails directing the export or output of the desktop publishing program 50 to a storage medium rather than to a parallel communications port. In either case, PostScript instructions that incorporate the color modifications to the graphics within the EPS file are generated. If printing is not to take place, the program is done.

If the publication is to be printed, at block 102 the user is given the option to preserve the EPS colors in the EPS file as they were created, rather than implementing the modifications developed using the desktop publishing program 50. If the EPS colors are to be preserved, at block 104 the publication is sent to a printer or disk without changing the original definitions of the EPS colors. Otherwise, at block 106 a color editing subroutine (FIG. 10) is called to incorporate the color modifications previously specified by the user at block 94. Once the modifications are incorporated, the EPS file is then either printed by a composite printer or a PostScript file or stream is generated. Then the program is done.

FIG. 5 illustrates a routine for adding colors contained in an imported EPS file to the color palette of a desktop publishing program incorporating the color modifying routine illustrated in FIG. 3. That is, FIG. 5 illustrates a routine suitable for use in adding EPS colors to a color palette shown at block 82. At block 110, the EPS file is parsed for spot and process colors. As discussed above, the desktop publishing program only identifies those colors in the EPS file that have a name associated with them. At the present time, most drawing programs only name spot colors, although Aldus FreeHand presently creates EPS files that allow process colors to be identified. Perhaps others will incorporate this feature as the benefits of the technology disclosed in this application become known.

To provide more detail regarding block 110, an EPS file may be parsed by looking at the file on a line-by-line basis until a color comment is encountered. Color comments are embedded in the PS code of EPS files and are ignored by the PostScript interpreter contained in the PS code. However, the color comments contain the color definitions of colors that are used in the PS code that is executed by the interpreter. Under PostScript guidelines, such comments are required for spot colors and must be contained within the EPS file. An example of a color comment is %%cmykcolor 0 8 79 0 (Pantone 115). The percentage signs preceding the comment indicate to the interpreter that the remainder of the line is to be ignored. An executable PS command to use this color is setcmykcolor 0 8 79 0.

At block 112, a test is made to determine if all of the identifiable colors in the EPS file have been listed in the "publication color list." The publication color list is an inventory of those colors contained in the publication. The publication color list will include all identifiable colors from imported EPS files as well as any colors created using the desktop publishing program 50. The term "publication color list" is used to differentiate this list from a list of colors associated with each EPS file. If all of the colors have been identified, the colors contained in the publication color list are displayed in the color palette (block 114) and the routine terminates. A suitable color palette display subroutine is illustrated in FIG. 6 and described below.

If all colors have not been identified, the next identifiable color is selected at block 116. For clarity in this discussion, the next identifiable color is referred to as the current color. At block 118, a test is made to determine if the current color is in the publication color list. If it is not, the current color is added to the publication color list at block 120, and the routine loops to block 110.

If the name of current color is in the publication color list, a test is made to determine (block 122) if the current color has the same attributes as those associated with the name of the color already in the list, referred to as the "located color." If the attributes of the located and current colors coincide, the program loops to block 110. If the attributes do not coincide, the routine prompts the user to see if the attributes of the located color are to be replaced by the definition of the current color (block 124). If the attributes of the located color are not to be replaced, the program loops to block 110. In this case, the current color will take on the attributes of the located color. If the attributes of the located color are to be changed, they are edited to match those of the current color, as shown at block 126. As will be appreciated, identically-named colors must have the same color attributes. Otherwise, the consistency of the publication will be undermined because there will be no way of telling the color attribute to which a name is referring. It should be noted that in the situation where identically-named colors have different color definitions, the routine can easily be revised to prompt for a new name for one of the colors. The routine then loops to block 110.

Figure 6:
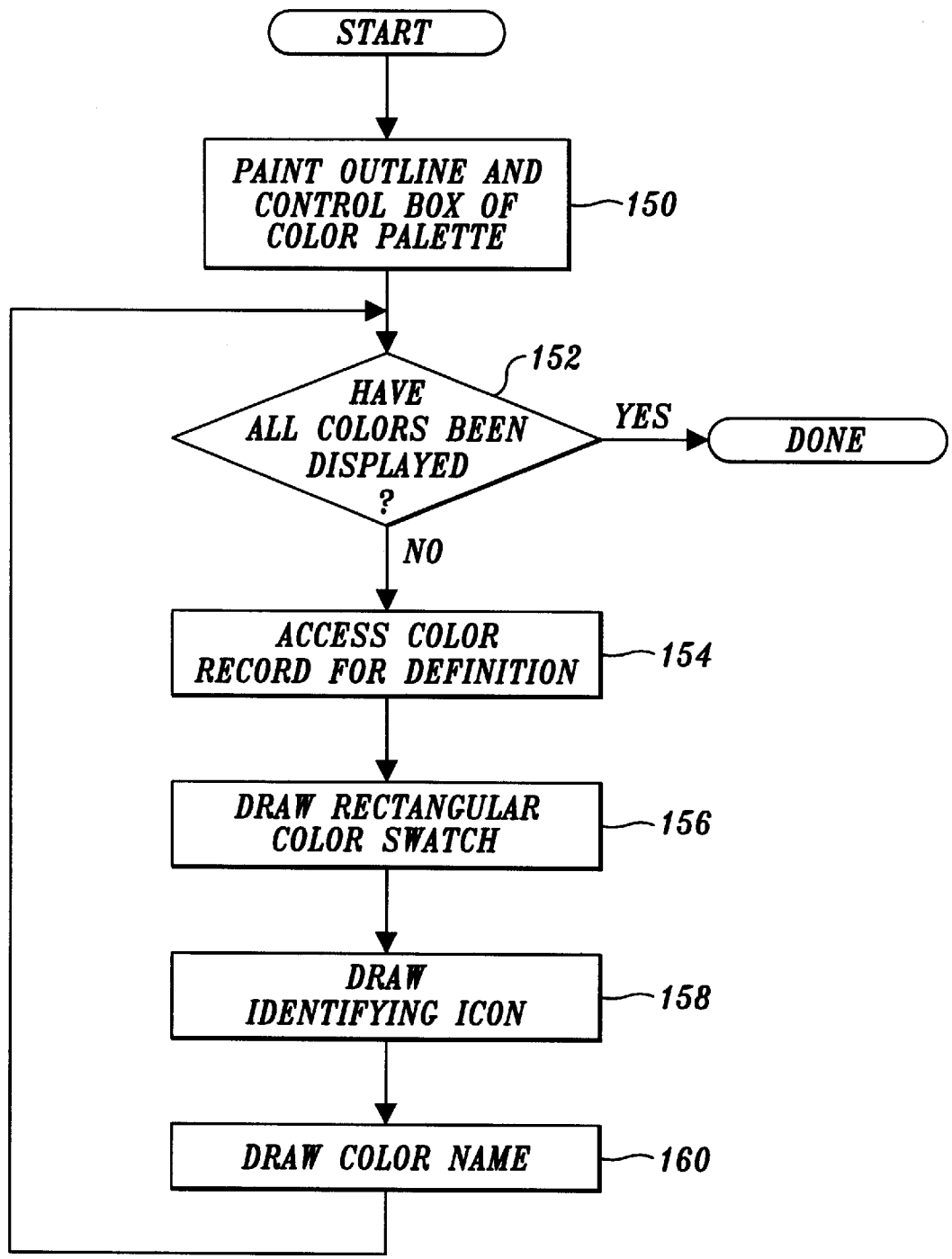
FIG. 6 is a flow chart illustrating how the color palette illustrated in FIG. 4 is displayed on a screen.

FIG. 6 is a flow diagram of a subroutine suitable for use in FIG. 5 (block 114) for displaying the publication color list within the color palette. At block 150, the outline and control box of the color palette are painted onto the screen. At block 152, a test is made to determine if all of the colors in the publication color list have been displayed. If all of the colors have been displayed, the routine terminates. Otherwise, at block 154, the definition of the next color to be displayed in the publication color list is retrieved from the color record.

As shown in FIG. 4, each listed color includes a rectangular-shaped color swatch 157 that displays the color associated with the color name. At block 156 of FIG. 6, the color swatch is drawn adjacent to the color. The color name swatch displays include any color modifications, which are typically not shown on the graphic itself until it is printed. The graphics are not modified on-screen. At block 158, an identifying icon, i.e., 90 or 92, is drawn onto the screen, adjacent to the color swatch, for those colors that are EPS colors and/or a tint of another color, respectively. As will be appreciated, identifying icons may also be used to display other attributes of each named color, such as whether the color is a spot or process color. The color name is then drawn at block 160, in italics for process colors and normal text for spot colors, and the program loops to block 152.

FIG. 7 illustrates an exemplary subroutine for defining the color of a newly-created graphic suitable for use in FIG. 3 (block 98). The graphic is drawn according to the user specifications, as shown at block 170. At block 172, a test is made to determine if the user wants to apply a color different from the default color assigned upon creation. If the color is not to be changed, the subroutine ends. Otherwise, at block 174 a test is made to determine if an existing color from the color palette is to be applied to the graphic. If an existing color is to be applied, the attributes of the graphic are changed at block 176 and the subroutine ends. If a new color is to be created, at block 178, the user creates the new color by entering the name and attributes of the new color. At block 179, the color of the graphic is changed to the newly-created color. The new color is added to the color palette at block 180, the subroutine ends, and the program returns to the color modifying routine of FIG. 3.

Figure 8:
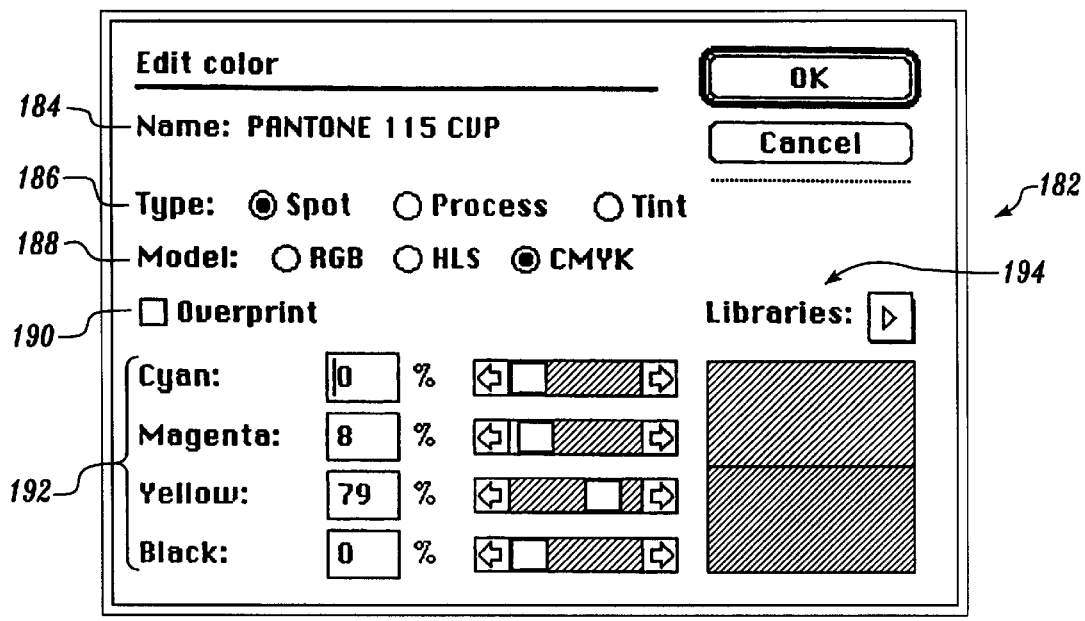
FIG. 8 is a pictorial representation of a dialog box for editing a color listed in a color palette or for adding a new color to a color palette.

FIG. 8 illustrates a dialog box 182 that contains the attributes necessary to define a color. Thus, the dialog box can be used to define a newly-created color or change the attributes of a color already in the color palette. The primary attributes of a color listed in the dialog box include: color name 184; color type 186, i.e., spot, process, or tint; color model 188, i.e., RGB (red, green, blue), HLS (hue, luminance, saturation), or CMYK; whether the named color is to overprint other colors 190; and the percentages of CMYK that are representative of the named color 192. If either of the RGB or HLS color models is selected, then the percentages 192 are listed in terms of red, green, blue, or hue, luminance, saturation, respectively. The dialog box can be used to modify colors in an EPS file in accordance with the invention. A user simply highlights the color of interest in the color palette, opens the dialog box 182, and makes desired changes to the named color. Through the dialog box, a user can also access a listing of a popular color matching systems, and import color names and attributes directly from these systems. This is shown by the "Libraries" designation at 194.

FIG. 9 is a flow diagram of a routine suitable for use in FIG. 3 (block 94) for editing the attributes of a color in response to changes made to the color by a user, e.g., through the dialog box of FIG. 8. Each color in the color palette has a color record within the desktop publishing program that keeps track of the attributes listed above, e.g., name, type, model, etc., as well as whether the color is from an EPS file and, if from an EPS file, whether the color has been modified. The color records are contained within the publication color list, which is referenced when a publication is being printed to a storage medium such as a disk, to a composite printer, or to an imagesetter. The publication color list was discussed above in FIG. 5 and accompanying text. The process of printing the publication entails generating PostScript files based in the native file format used by the desktop publishing program, i.e., the publication color list, which has incorporated the EPS graphics through the color records. The color records reference the colors within the various EPS files that have been imported into the publication, as well as any colors that were created using the desktop publishing program.

At block 200, the color record of a color that is to be edited is retrieved from the publication color list. At block 202, a test is made to determine whether the color type has been changed by the user. If the color type has been changed, the color record is edited to reflect this change at block 204. If the color type has not been changed, or after the color has been edited, the program branches to block 206. At block 206, a test is made to determine whether the model of the color has been edited by a user. If the color model has been changed, the color record for that color is changed to reflect the current model at block 208. If the color model was not changed, or after the model change was recorded, the program loops to block 210. At block 210, a test is made to determine whether there has been a change in the component color percentages, i.e., in the percentages of CMYK, RGB or HLS. If the color percentages have been changed, the color record for that color is edited at block 212. If the component color percentages were not changed, or once the color is edited at block 212, the routine loops to block 214 where the color record of the color that has been edited is stored to the publication color list. The routine then terminates.

Figure 10:
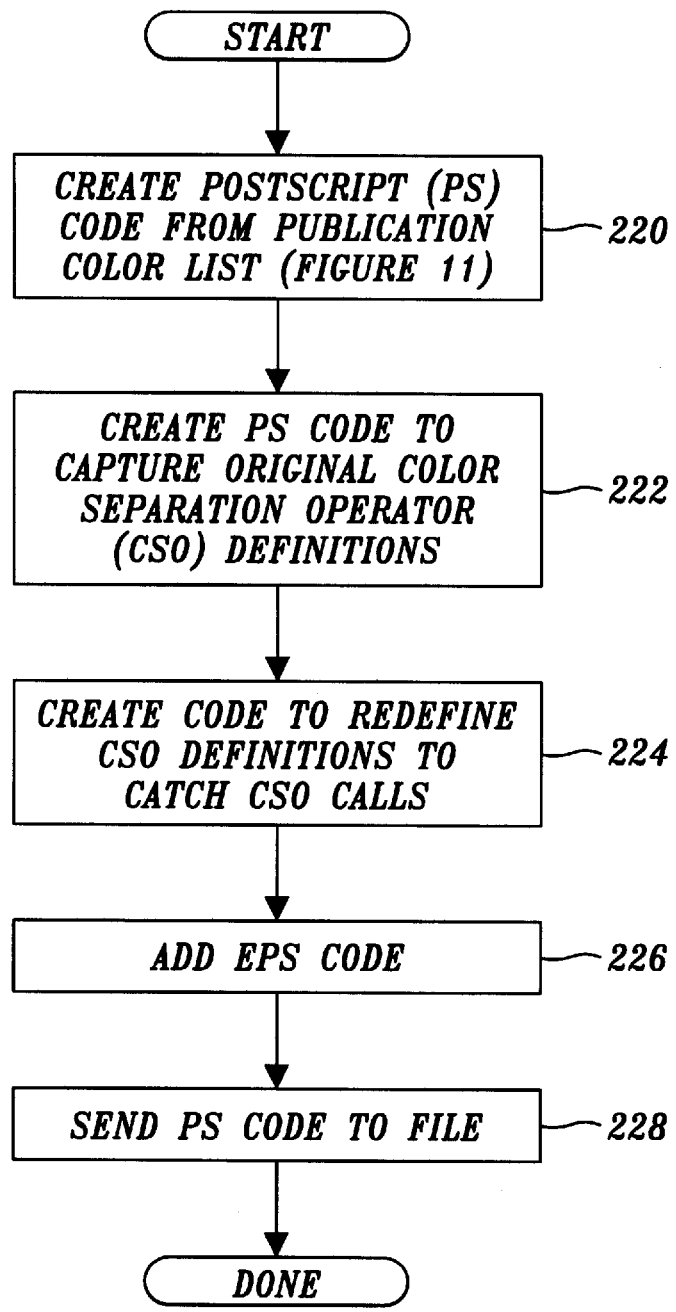
FIG. 10 is a flow chart illustrating how PostScript code from a publication that is to be sent to a file or printer is generated, the PostScript generation including any modifications made to color EPS graphics in accordance with the invention.

FIG. 10 illustrates an exemplary routine for generating PostScript (PS) code that incorporates the modifications to colors imported from an EPS file in accordance with the invention. Once generated, the PostScript commands are sent to a file, a printer or an imagesetter. For clarity in this discussion, it is assumed that the commands are being sent to a file. At block 220, PS code containing the modified colors is generated from the publication color list. As described above, the publication color list contains any modifications that the user made to colors imported from an EPS file or files. The creation of PS code from the publication color list, referred to throughout the remainder of this discussion as the "PS color table", is described in FIG. 11 and accompanying text.

At block 222, PS code is created to capture or store the original definitions of the PostScript Color Separation Operators (CSOs). Color Separation Operators are PostScript language programming conventions intended to facilitate the generation of color separations on a black and white PostScript printer. The CSOs identify color separation segments, define special colors, and list color use. The CSO definitions to be stored in accordance with the PS code created at block 222 will generally include: setcmykcolor, setrgbcolor, sethsbcolor, setgray, setcustomcolor, setprocesscolor, setoverprint, setseparationgray and image. The function of these operators is known to those skilled in PostScript color separation techniques, and is also described in *Proposal for Color Separation Conventions for PostScript Language Programs*, Technical Note #5044, published by the PostScript Developer Support Group (Dec. 12, 1989), which is hereby incorporated by reference. The definitions are stored in the publication dictionary, which is discussed below.

At block 224, PS code is created to redefine the captured CSOs such that, at the execution of the PS file, when a CSO that has been redefined is called, the redefined CSO will consult the PS color table to ascertain whether the color being invoked is one that has been modified by the user. Without redefinition, the CSO would simply look to the color definition provided in the EPS, and PostScript would be generated using that definition. With the redefinition, a subroutine is called to check the PS color table for the presence or absence of the color. As is described below, if a color is present in the PS color table, the EPS color values are popped off of the PS stack, and replaced with the modified color attributes from the PS color table.

Upon redefinition of the CSOs, at block 226 EPS code from any EPS files incorporated in the publication is added to the code created in blocks 220–224. The PS code generated in FIG. 10, or added in the case of EPS files, is sent to a file at block 228. The routine then terminates.

Figure 11:
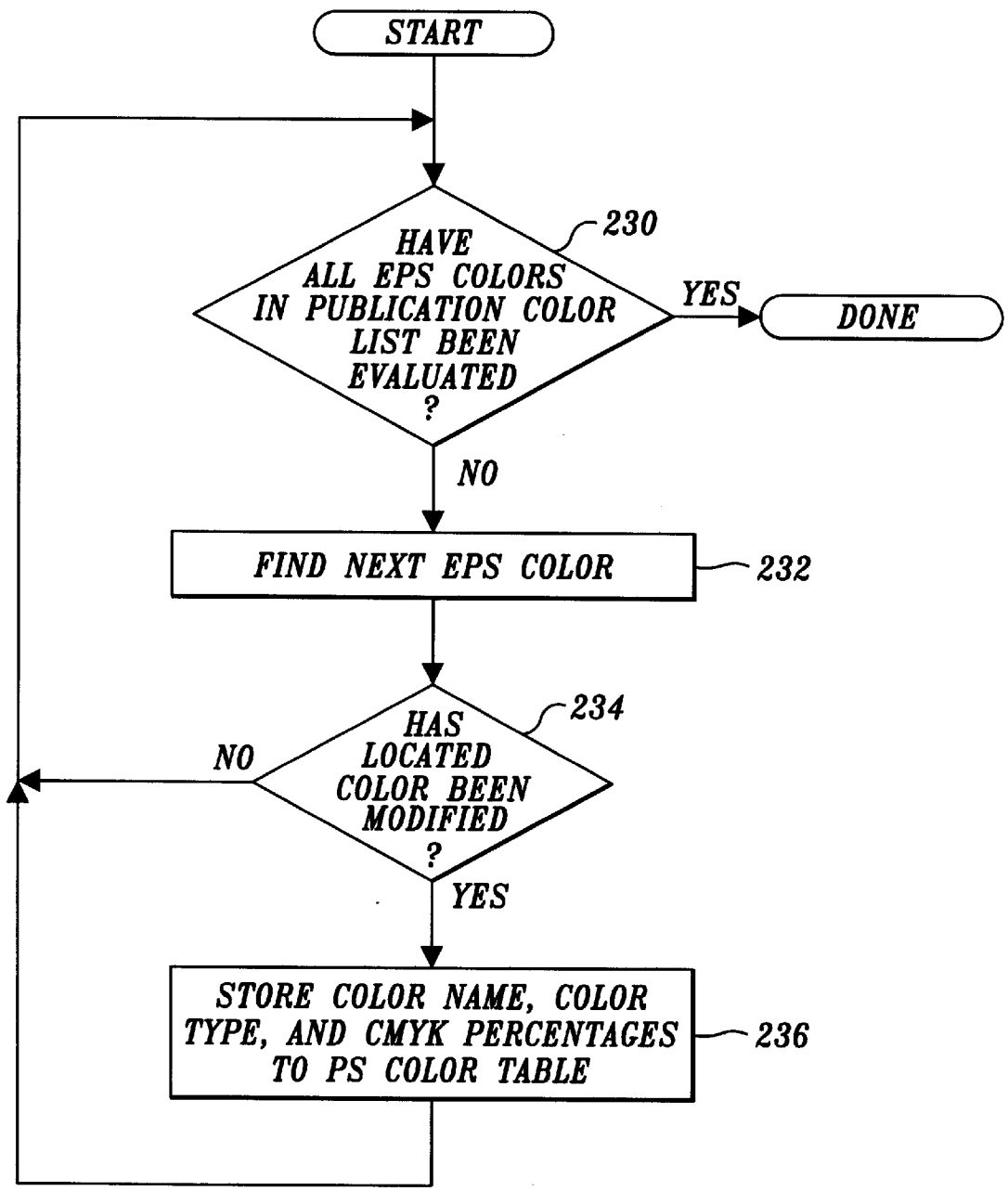
FIG. 11 is a flow chart illustrating how a PostScript table of those colors in the EPS file that were modified by the desktop publishing program are created.

FIG. 11 illustrates a flow diagram of a routine that may be used to create the PS color table in FIG. 10 (block 220). The routine looks to the color record of each EPS color in the publication color list and modifies the definition of those colors that have been changed. At block 230, a test is made to determine if all the EPS colors in the publication color list have been evaluated. If all of the EPS colors have been evaluated, the routine terminates. Otherwise, the next EPS color is found at block 232. At block 234, a test is made to determine whether the located EPS color has been modified by evaluating the color record for that color. Modified EPS colors will have a flag in their color records indicating that a change has been made. If the located color has been modified, the color name, color type, and component color percentages, e.g., the CMYK percentages, are stored to the PS color table at block 236. The routine then loops to block 230. If the located color was not modified, the routine loops directly to block 230.

Figure 12:
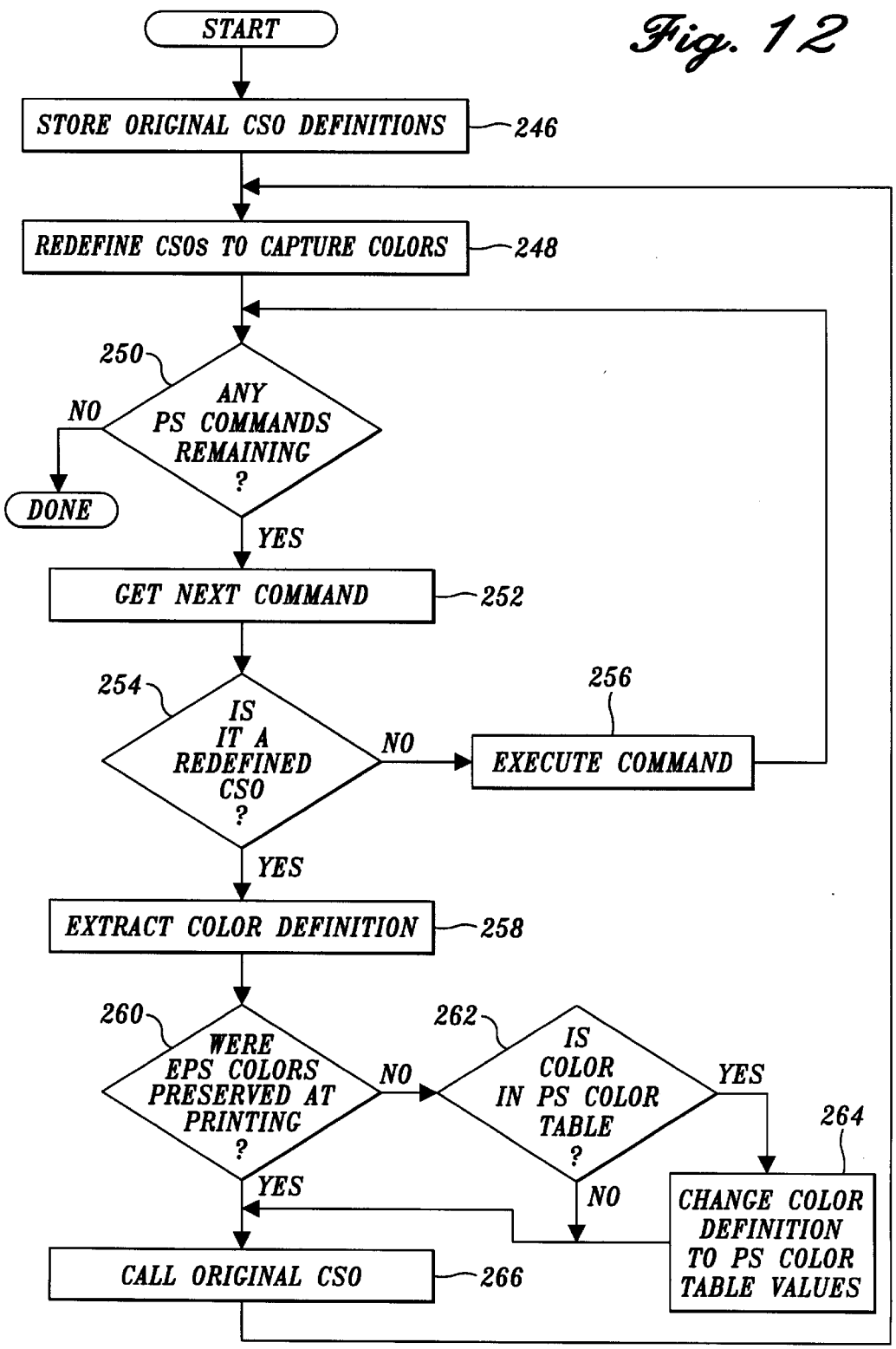
FIG. 12 is a flow chart illustrating how the PostScript code generated in FIG. 10 is interpreted by a printer or an imagesetter.

FIG. 12 is a flow diagram illustrating how the PS code generated in FIG. 10 is interpreted by an interpreter in a printer or an imagesetter. At the outset, it is noted that the flow diagram is not representative of the interpretation where there is a "nesting" of EPS files created by the desktop publishing program. An explanation of nesting and the flow diagrams for this instance is set forth below in FIGS. 13–16 and accompanying text.

The routine of FIG. 12 begins at block 246, where the original definitions of the CSOs that are to be redefined are stored. At block 248, the CSOs listed above are redefined to catch colors. This entails storing new definitions for the CSOs such that when a redefined CSO is called, a routine is implemented that looks to see if the color associated with the call is in the PS color table. At block 250, a test is made to determine whether there are any PS commands left to be interpreted in the PS file. If all of the commands have been executed, the interpretation of the publication is complete and the routine terminates. Otherwise, at block 252 the next PS command is obtained from the PS file. At block 254, a test is made to determine whether the command is a CSO that has been redefined. If the command is not a CSO that has been redefined, the command is executed at block 256, and the routine loops to block 250. If the command is a redefined CSO, the color definition of the color associated with the CSO currently being executed is extracted from the EPS file at block 258.

At block 260, a test is made to determine if the original EPS colors were preserved upon printing the publication to the file (block 102 of FIG. 3). If the EPS colors were not preserved, at block 262 a test is made to determine whether the EPS color associated with the CSO is in the PS color table, which indicates that the color has been modified. If the color has been modified, the color definition is changed to the values listed in the PS color table at block 264. Once the color definition has been changed, or if the color was not modified, if the EPS colors were preserved, the original CSO is called at block 266, i.e., using the definition of the CSO stored at block 248. Calling the original CSO will execute the command as intended by PostScript, with the EPS values if the color was not redefined or if EPS colors were preserved, or with the color modifications if the color was redefined. More particularly, block 266 entails setting the definitions of the CSOs to their original definitions (stored at block 246) and then calling the CSO. The routine then loops to block 248.

As was stated above, the routine illustrated in FIG. 12 is not valid if there is a nesting of EPS files created by the desktop publishing program itself Nesting occurs when an EPS is exported by the desktop publishing program, and subsequently imported back into the desktop publishing program. For example, nesting will be present in the situation where an EPS file is imported, modified according to the invention, stored in an EPS format, and then imported by the desktop publishing program 50. Without modification, the routine of FIG. 12 does not contain the necessary steps to compensate for nesting, and may cycle through an endless loop because the redefinition of the CSOs at block 248 will result in the routine calling itself FIG. 13 illustrates an example of nesting of two EPS files 270 and 272, each contained within a desktop publishing program (DPP) document 274. The EPS file 270 is designated as a non-desktop publishing program ("Other EPS"), indicating that the file was exported as an EPS by a program other than the desktop publishing program 50. In contrast, the EPS file 272 is assumed to have been modified in accordance with the invention, and then exported as an EPS by the desktop publishing program 50. The EPS 272 is also designated by the label "DPP EPS." The EPS 272 is assumed to have been modified and subsequently imported back into the document 274.

As is known to those skilled in the PostScript programming language, the recommended structure for a PS file is that it contain two basic components: a prolog and a script. The prolog contains procedures, as well as named variables and constants, that will be used throughout the rest of the document. The prolog is written by a PS programmer, and will precede the first part of every document, or script, that uses it. The script provides the setup for the document and describes the specific elements to be produced as the output in terms of procedures and variables defined in the prolog, along with operand data.

Another PS concept necessary for the discussion below is that PostScript uses dictionaries to implement its processing functions. PostScript maintains a dictionary stack where all of PS operations are defined. Generally, there are two default dictionaries that are placed on the dictionary stack when PostScript begins processing: systemdict and userdict. Other dictionaries are often added to the top of the dictionary stack by the prolog of each document. The topmost entry on the dictionary stack is called the current dictionary. It is this dictionary that defines PS operations as a publication is being printed. For clarity in this discussion, the dictionaries for EPS 272 and document 274 are respectively called "ALPS2" and "ALPS1". As an example, if the execution of document 274 is somewhere in EPS 270, the dictionary stack may include, from the bottom: systemdict, userdict, ALPS1, ALPS2.

Throughout the discussion of FIGS. 13–16, the PS code within document 274 that is currently being executed will be referenced by the term "context", which in essence indicates the dictionary which is currently at the top of the dictionary stack. Execution is at a lower context if EPS 272 is currently being executed, and at a higher context if the script of document 274 is being executed, other than during the execution of EPS 272.

Figure 14:
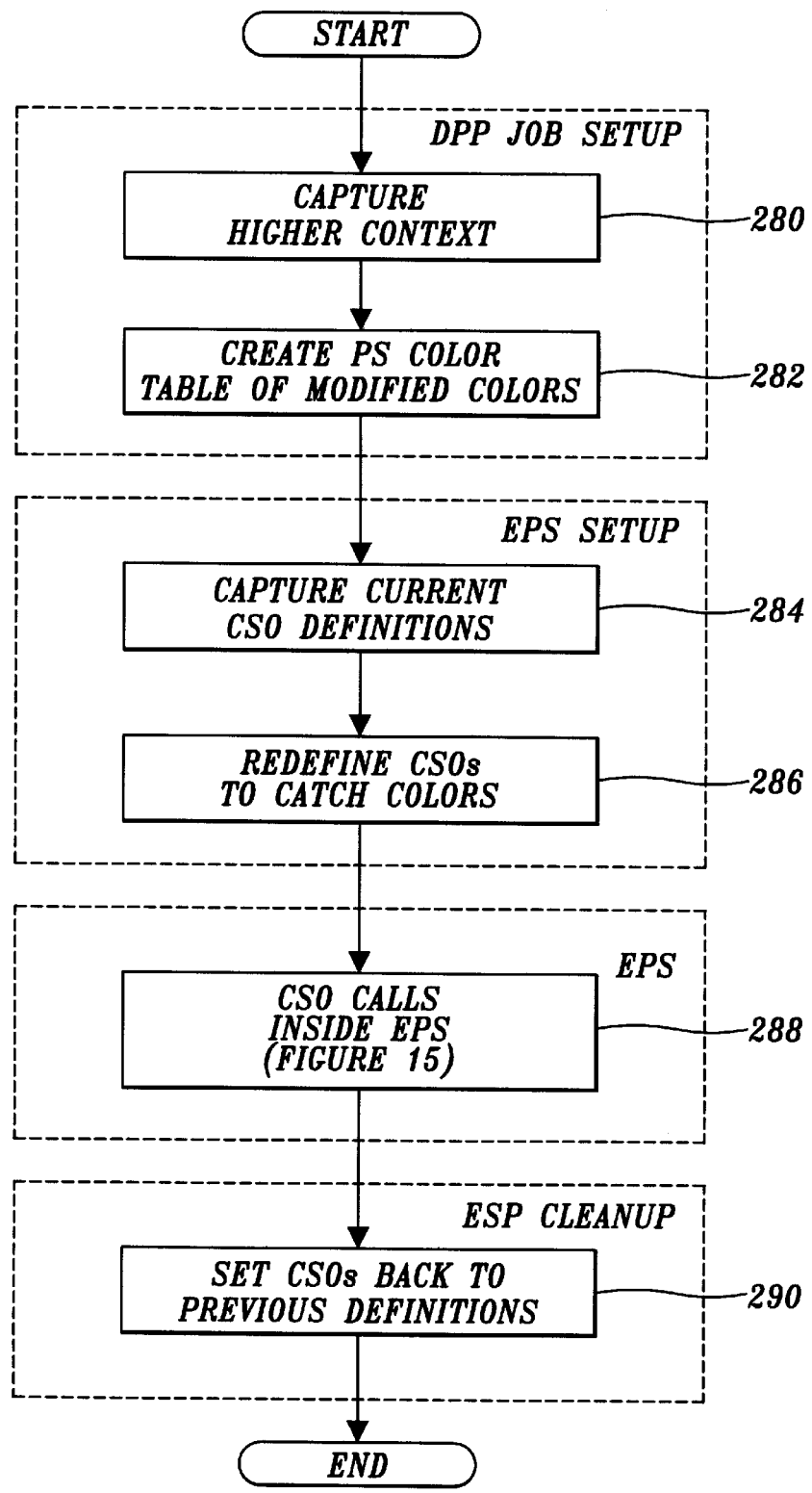
FIG. 14 is a flow chart illustrating the interpretation of PostScript code generated in FIG. 10, when there is nesting of EPS files within the publication.

FIG. 14 is a flow diagram of a routine that provides a general overview of how a DPP job containing an embedded EPS is interpreted. A DPP job is defined as the execution of a desktop publishing document or an EPS which has been incorporated within a desktop publishing document. The routine is called for each level in a group of nested EPS files that have been exported by the desktop publishing program and once for the document that encloses the nested files. Thus, in the example of FIG. 13, the routine would be called twice. The PS code for the routine is generated according to the flow diagram of FIG. 10. The routine of FIG. 14 begins at block 280 by capturing the higher context, if one exists, of any embedding DPP job. In other words, if the current job is embedded in another job, a pointer to the prolog of the embedding job is saved in the current job. With reference to FIG. 13, there will be one higher context when EPS 272 is being executed. At block 282, a PS table of those colors in an embedded EPS that have been modified is created. Blocks 280 and 282 represent steps taken at the DPP job level. Block 280 is a step taken at the beginning of the desktop publishing program prolog.

At block 284, the current CSO definitions are captured or stored in a hold variable. At block 286, the CSOs are redefined according to the current context to catch colors. Blocks 284 and 286 Thus, blocks 284 and just before an EPS is emitted. Thus, blocks 284 and 286 occur at EPS setup. At block 288, the script portion of the EPS is executed. At block 290, the CSOs are redefined to their previous definitions, i.e., that were captured at block 284. Thus, block 290 is a cleanup step taken once the entire EPS has been executed. The routine then terminates.

Figure 15:
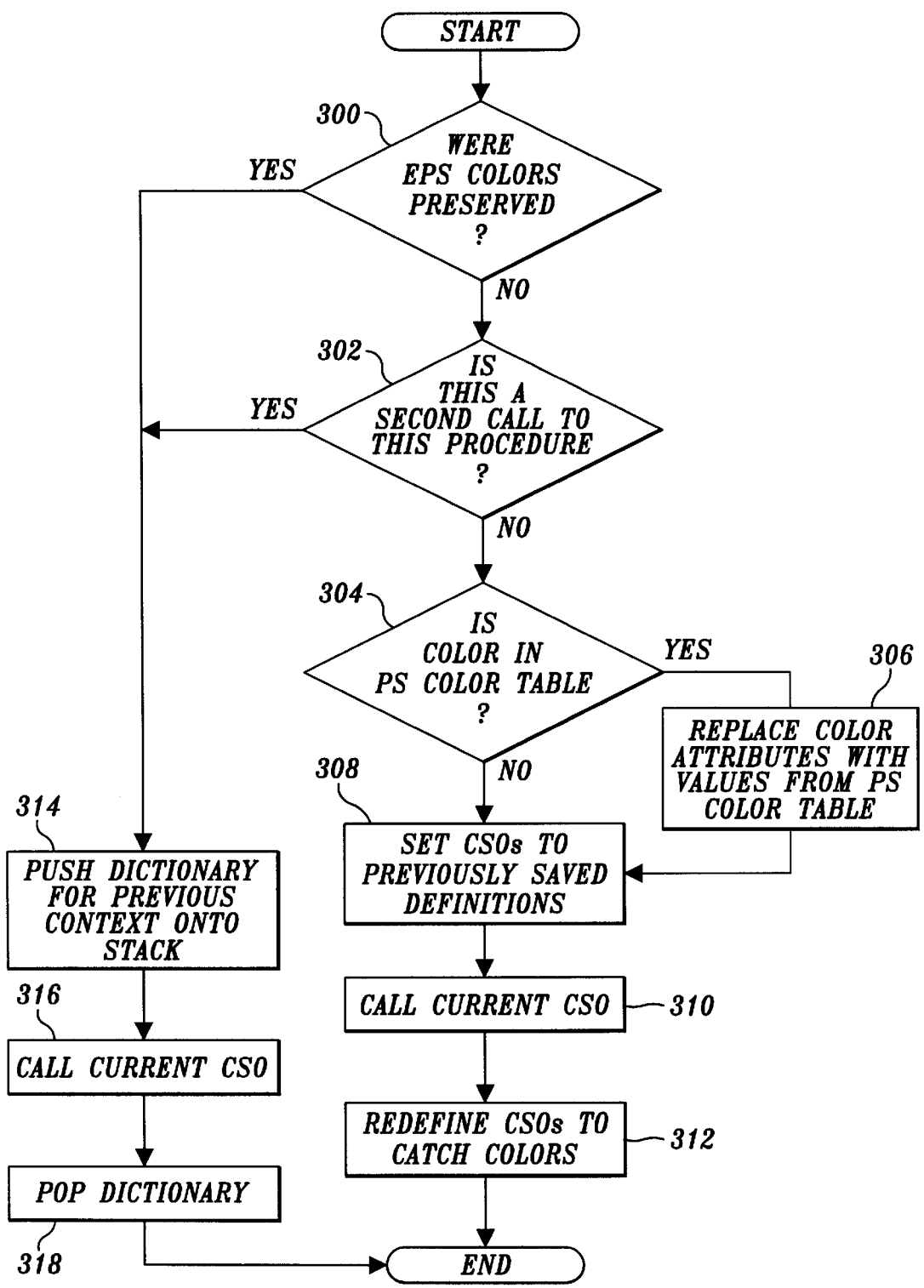
FIG. 15 illustrates a flow diagram of a routine that allows modifications to EPS colors while accommodating nesting of EPS files within the desktop publishing program.

FIG. 15 is a flow diagram illustrating a recursive routine that allows (1) the modification of EPS color values in accordance with the invention; and (2) nesting of DPP-created EPS file inside DPP jobs. The routine of FIG. 15 will be invoked during calls to the redefined CSOs, which occurs at block 288 of FIG. 14 and also during recursive calls to itself, as discussed below. The CSO invoking a call to FIG. 15 is referred to as the "current CSO." Each call to a CSO, including blocks 310 and 316 of FIG. 15 and block 288 of FIG. 14, will either (1) execute the original CSO definition defined somewhere outside the desktop publishing program or (2) return control to block 300 of FIG. 15.

At block 300, a test is made to determine whether the original EPS colors were preserved upon printing the EPS to a file (block 102 of FIG. 3). If the EPS colors were not preserved, at block 302 a test is made to determine whether this is the second pass through the present routine. If this is not the second pass, at block 304 a test is made to determine whether the EPS color associated with the current CSO is in the PS color table, which indicates that the color has been modified. If the color was modified, the color definition of the color is changed at block 306 to the values listed in the PS color table.

After the color has been redefined, or if the color was not modified, the CSOs are set back to their previous definitions, i.e., the definitions that were stored at block 284 of FIG. 14. The current CSO is then called at block 310. Upon returning from the call at block 310, the CSOs are again redefined to catch colors at block 312. This block is identical to block 286 of FIG. 14. The routine then terminates.

With reference again to blocks 300 and 302, if EPS color were preserved, or if the present pass is the second pass through this routine, the dictionary that was saved at block 280 in FIG. 14 is pushed onto the dictionary stack. The current CSO is then called at block 316. Upon returning from the call at block 314, the dictionary at the top of the dictionary stack is popped off of the stack at block 318. The routine then terminates. As will be appreciated from the foregoing, blocks 302 and 314–318 handle those publications that have one or more DPP documents nested in another DPP document.

To aid in the explanation of the flow diagrams of FIGS. 14 and 15, details within FIG. 13 are provided, including simplified instances of modifications to the color "blue" in both the EPS file 272 and again in the DPP document 274. It is assumed that EPS colors were not preserved when printing either of the documents to file. The EPS file 270 defines the color blue as values 'abcd', each of which range from 0 to 1, with 0 being 0% ink and 1 being 100% ink. In EPS file 272, blue has been modified or set equal to values 'efgh'. Finally, in document 274 blue was again modified or set equal to the values 'ijkl'. A CSO titled "findcmykcustomcolor" is assumed to exist prior to executing the job, i.e., find cmykcustomcolor is equal to an "original," existing definition.

At each level, the previous context (variable prevcontext) has been captured as described in FIG. 14, block 280. At the DPP document level, prevcontext simply points to the same context since there is no higher levels. At the DPP EPS level, prevcontext points to the ALPS1 dictionary, from the DPP document. Also at each level, a PS color table has been built containing new values for the edited colors, as described in FIG. 14, block 282. In this example, it is assumed that only the color "blue" has been modified. Further, at each level the current definition of the CSO findcmykcustomcolor has been saved by setting its value equal to variable "x" (FIG. 14, block 284) and redefined to catch colors (FIG. 14, block 286), i.e., by setting findcmykcustomcolor equal to variable "DPPdef". This redefinition will invoke the routine of FIG. 15 (sometimes from within FIG. 15) whenever a CSO that has been redefined is called.

Figure 16A:
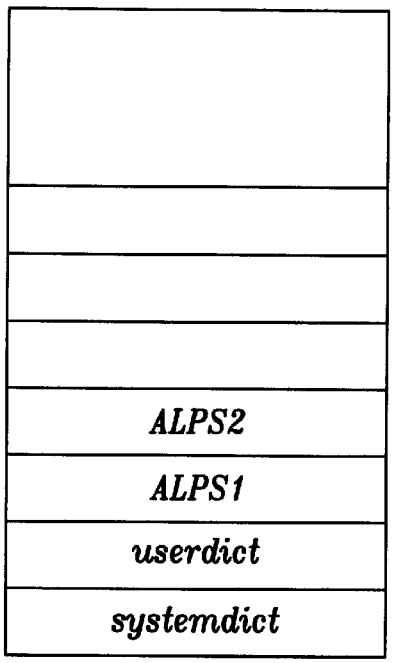
FIGS. 16A and FIG. 16B illustrate the contents of a dictionary stack through various stages in the routine of FIG. 15.

To begin the following explanation, it is assumed that findcmykcustomcolor has been called while executing the EPS 270. FIG. 16A illustrates the current values on the dictionary stack at the point that the call "abcd (blue) findcmykcustomcolor" is executed from within the EPS 270. Since the current definition of findcmykcustomcolor is DPPdef, the calling of findcmykcustomcolor will invoke the routine of FIG. 15. In FIG. 15, the results of the tests at both blocks 300 and 302 are no. At block 304, it is determined that the color blue is in the PS color table, and its attributes are changed from 'abcd' to 'efgh' at block 306. (Note: the routine is executing code defined by ALPS2, the dictionary from the DPP EPS.)

Figure 16B:
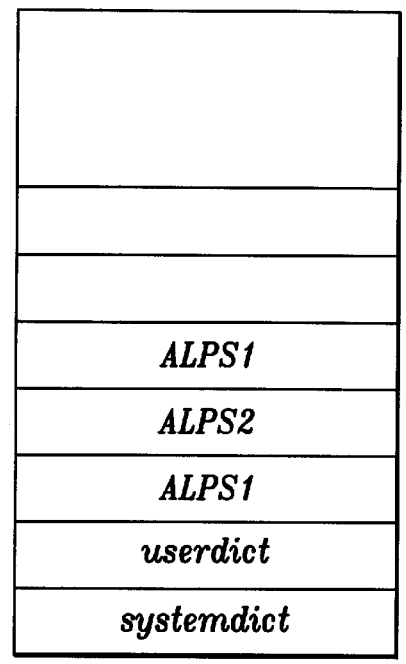

At block 308, findcmykcustomcolor is set to what was saved by 'x'. It is noted that since the color blue had also been changed at the DPP document level, the value of 'x' in ALPS2 contains the name "DPPdef", which is the name of the routine currently being executed. At block 310, findcmykcustomcolor is again called. Since its definition is still DPPdef, this is a recursive call to the calling routine, and the routine will begin again at block 300. Since this is the second call to the routine, the result of the test at block 302 is yes, and the routine loops to block 314. At block 314, the dictionary from the previous context (saved by the variable prevcontext), i.e., ALPS1, is pushed onto the stack. FIG. 16B illustrates the dictionary stack values at this point in time. The routine is now executing code using ALPS1. At block 316, the CSO is called. Its value is still DPPdef, and thus this is a second recursive call to the routine of FIG. 15, and the routine will begin again at block 300.

At this point, a different copy of the routine is being executed than those previous, i.e., the copy stored in ALPS1 instead of ALPS2. The results of the tests in blocks 300 and 302 are no, and the routine continues at block 304, where a test is made to determine if the color (blue) associated with the CSO has been modified. Since blue was modified, its values are replaced at block 306, from 'efgh' to 'ijkl'. At block 308, the definition of findcmykcustomcolor is again set to 'x'. However, this time 'x' is the original definition of the CSO, i.e., the definition that existed prior to intervention by the desktop publishing program. Thus, when the CSO is called at block 310, the values 'ijkl' are used for blue. At block 312, findcmykcustomcolor is set back to DPPdef to catch colors. The routine then returns to the point just after the most recent "call current CSO" command, which was at block 316.

At block 318, the dictionary at the top of the stack is popped, which in this case is ALPS1. FIG. 6A indicates the values on the stack at this point. After block 318, the routine returns to the point just after the "call current CSO" that was prior to the call from block 316. Thus, the routine returns to the point just after block 310. At block 312, the value of findcmykcustomcolor is set back to DPPdef The routine terminates, since there are no longer any recursive calls to the current CSO, findcmykcustomcolor. The desktop publishing program then returns to block 288 of FIG. 14, where the rest of the EPS is executed. Once the entire EPS has been executed, the CSO are set back to their original definitions at block 290 and the routine ends.

As will be appreciated from the forgoing, the desktop publishing program provides a number of advantages over prior art programs. The desktop publishing program provides that ability to modify EPS colors during the layout phase of a publication, without requiring access to the originating program. Further, the listing of colors in the color palette allows one to easily ascertain the number of plates a publication will require, and to modify the colors if the number is deemed too large or if there are colors that are either identical or quite similar, but having different names.

Another advantage of the technology described herein is that it may be used with color management systems. Color management systems attempt to show a user consistent color, whether it be displaying color on a screen, printing color on a color printer, or scanning a photograph. Without color management, colors often vary among the devices that display, print and scan images. For instance, after scanning a photograph it is beneficial to have the color display of the photograph be as close to the original as possible. The same is true for printing the photograph to a printer. Some popular color management systems include: Electronic for Imaging (EFI) Eficolor™, Apple ColorSync™ and the KEPS™ color management system.

Color management systems provide consistent color by understanding the limitations or intricacies of different devices and compensating for those by intercepting data streams and adjusting color values as the stream is being sent to a device, or by creating a new image that incorporates the color changes. TIFF files are often color managed. EPS files have typically not been color managed because of their encapsulated nature, and because of a perception that you have to rewrite the EPS at each line in which color management was to occur. The invention alleviates this perceived necessity, at least with regard to the exporting or printing of EPS files, by allowing colors within an EPS to be modified in accordance with the discussion above, and subsequently printed.

It is noted that while the preferred embodiments of the invention have been illustrated and described, various changes can be made therein without departing from the spirit and scope of the invention.

The embodiments of the invention in which an exclusive property or privilege is claimed are defined as follows:

1. A method of modifying one or more colors contained in a color EPS file in a computer program, each color in the EPS file being identified by a color name and having a predetermined first set of associated color attributes that define the color, the method comprising the steps of:

(a) importing the EPS file into the computer program;

(b) identifying at least one color name in the EPS file;

(c) designating, in response to user input, a second set of color attributes for the at least one color name, the second set of color attributes being different than the predetermined first set of color attributes;

(d) transmitting the EPS file; and (e) while transmitting the EPS file, automatically identifying the at least one color name and automatically associating the second set of color attributes with that color name such that the attributes of the corresponding color of the EPS file are modified from the predetermined first set originally specified in the EPS file.

2. The method of claim 1, including transmitting the EPS file to a printer, and printing the EPS file at the printer with the second attributes for the at least one color.

3. The method of claim 1, including transmitting the EPS file to a storage medium, and storing the second set of color attributes in association with the at least one color name.

* * * * *